(12) United States Patent
Kim et al.

(10) Patent No.: US 9,815,420 B2
(45) Date of Patent: Nov. 14, 2017

(54) BUSHING FOR MANUFACTURING STRUCTURAL COMPOSITE PREFORM

(71) Applicant: MS AUTOTECH CO., LTD., Gyeongju-si, Gyeongsangbuk-do (KR)

(72) Inventors: Jang Soo Kim, Gwacheon-si (KR); Dae Ho Yang, Suwon-si (KR); Young Sun Choi, Ansan-si (KR); Woo Young Kim, Suwon-si (KR); Hyun Woo Lee, Suwon-si (KR); Ju Hong Kim, Ansan-si (KR)

(73) Assignee: MS AUTOTECH CO., LTD., Gyeongju-si (KR)

( * ) Notice: Subject to any disclaimer, the term of this patent is extended or adjusted under 35 U.S.C. 154(b) by 0 days.

(21) Appl. No.: 15/139,427

(22) Filed: Apr. 27, 2016

(65) Prior Publication Data

US 2017/0274838 A1    Sep. 28, 2017

(30) Foreign Application Priority Data

Mar. 24, 2016  (KR) .......................... 10-2016-0035513

(51) Int. Cl.
| | | |
|---|---|---|
| *B60R 13/02* | (2006.01) | |
| *B29C 70/56* | (2006.01) | |
| *B29K 105/10* | (2006.01) | |
| *B29K 307/04* | (2006.01) | |
| *B29L 31/30* | (2006.01) | |

(52) U.S. Cl.
CPC .......... *B60R 13/0243* (2013.01); *B29C 70/56* (2013.01); *B29K 2105/10* (2013.01); *B29K 2307/04* (2013.01); *B29L 2031/3041* (2013.01)

(58) Field of Classification Search
CPC ..... B60R 13/0243; B29C 70/56; B62D 29/04; B29K 2307/04; B29K 2105/3041; B29L 2031/3041
USPC ... 296/203.01, 187.03, 187.12, 146.5–146.7, 296/901.01
See application file for complete search history.

(56) References Cited

U.S. PATENT DOCUMENTS

| | | | |
|---|---|---|---|
| 4,419,908 A * | 12/1983 | Reikowski | B29C 43/42 156/173 |
| 4,460,531 A * | 7/1984 | Harris | B29C 70/347 156/173 |
| 6,286,879 B1 | 9/2001 | Haque et al. | |
| 6,649,109 B1 * | 11/2003 | Renault | B29C 43/203 264/258 |
| 6,817,638 B1 | 11/2004 | Choi et al. | |
| 8,376,426 B2 | 2/2013 | Choi et al. | |
| 2005/0023847 A1 * | 2/2005 | Van Damme | B29C 70/46 293/120 |
| 2015/0108793 A1 * | 4/2015 | Peschansky | B62D 29/041 296/204 |
| 2016/0031385 A1 * | 2/2016 | Lee | B60R 13/0243 24/289 |

(Continued)

*Primary Examiner* — Gregory Blankenship
(74) *Attorney, Agent, or Firm* — Sughrue Mion, PLLC

(57) ABSTRACT

Provided is a bushing for manufacturing a three-dimensional composite preform using a tow made of a fiber reinforced polymer. The bushing includes a base plate in which one or more through-holes are formed, and a plurality of spools spaced apart from each other on the base plate. A flat top is formed at an end portion of the spools, and grooves are formed on outer surfaces of the plurality of spools in a circumferential direction thereof.

8 Claims, 6 Drawing Sheets

(56) References Cited

U.S. PATENT DOCUMENTS

2016/0145747 A1\* 5/2016 Watson ............ G06K 19/07749
   205/93
2016/0257081 A1\* 9/2016 Butcher ................ B29C 70/543

\* cited by examiner

BUSHING FOR MANUFACTURING STRUCTURAL COMPOSITE PREFORM

CROSS-REFERENCE TO RELATED APPLICATION

This application claims the benefit of Korean Patent Application No. 10-2016-0035513, filed on Mar. 24, 2016, in the Korean Intellectual Property Office, the disclosure of which is incorporated herein in its entirety by reference.

BACKGROUND

The present invention relates to a structural component for a vehicle, which is made of a polymer composite, and more particularly, to a structural component for a vehicle, into which a three-dimensional preform made of a fiber reinforced composite is inserted for reinforcement. In particular, the present invention relates to a bushing used to manufacture a preform.

One of hot issues in vehicle industries is weight lightening. Due to a fuel efficiency regulation exceptionally tightened in U.S.A, Europe, and the like, the weight lightening is a problem that needs to be essentially solved.

Recently, the weight lightening has been mainly realized through an application of ultra high strength steel (UHSS) or an application of high strengthening of steel, such as a hot press forming process. However, in order to improve revolutionary weight lightening in the future, a change in material is inevitable.

Representative examples of lightweight materials capable of replacing steel include nonferrous metals such as magnesium and polymer composite materials such as engineering plastic and carbon fiber reinforced plastic (CFRP).

Among the lightweight materials, a resin material, i.e., an interested object of the present invention has been actively applied to, especially, a bumper beam as disclosed in U.S. Pat. Nos. 6,286,879, 6,817,638, 8,376,426.

A bumper beam, in which a reinforcement material is inserted into a body of a glass mat reinforced thermoplastic (GMT) in a length direction thereof, is disclosed in U.S. Pat. No. 8,376,426. For example, long fiber reinforced plastic having excellent mechanical strength may be used as a reinforcement material.

The bumper beam is manufactured by inserting a pre-manufactured reinforcement material, i.e., a three-dimensional preform into a mold, and then, press-molding the three-dimensional preform with GMT.

SUMMARY

The present invention is to provide a bushing to form a composite preform.

In addition, the present invention is to provide a structural component for a vehicle, which is reinforced using the bushing.

A three-dimensional preform may be manufactured, for example, using a tow made of a carbon fiber in which a thermoplastic resin is impregnated. This kind of fiber reinforced polymer composite, which may be in liquid state when heated, can be rapidly cured at room temperature. The preform may mean a cured three dimensional framework made by the tow.

In order to achieve the purposes, a bushing for manufacturing a structural composite preform according to the present invention may have a structure in which spools to wind the tow around the bushing are disposed like table legs on a base plate.

According to an embodiment, the bushing includes a base plate in which a through-hole is formed; and two or more spools spaced apart from each other on the base plate along an edge thereof.

According to an embodiment, the spool may extend upward from the base plate and may have a flat top and a groove for winding around it with the tow, the flat top being formed at an end portion of each of the spool, and the groove being formed on an outer surface of the spool in a circumferential direction thereof. A portion opposite to the base plate may be open.

According to an embodiment, the bushing may further include a reinforcement structure formed on the base plate to support the spools from the back sides of the spools.

According to an embodiment, the through-hole may comprise a main hole formed at a center portion of the base plate and further comprises one or more sub holes formed around the main hole.

According to an embodiment of the present invention, the bushing used to manufacture a preform may be integrated with the preform. In the course of forming a preform, a tow may be wound around a bushing in order to change a passing direction of the tow and to maintain tension of the tow. The bushing may be integrated with the preform when the tow is cured.

A structural body part for a vehicle may be manufactured using the preform integrated with the bushing. A plurality of bushings may be used to manufacture the preform. The bushing may be disposed at a predetermined position where needed to be reinforced in the structural body part.

BRIEF DESCRIPTION OF THE DRAWINGS

Embodiments of the present invention will be more clearly understood from the following detailed description taken in conjunction with the accompanying drawings in which.

DETAILED DESCRIPTION OF THE EMBODIMENTS

Figure 1:
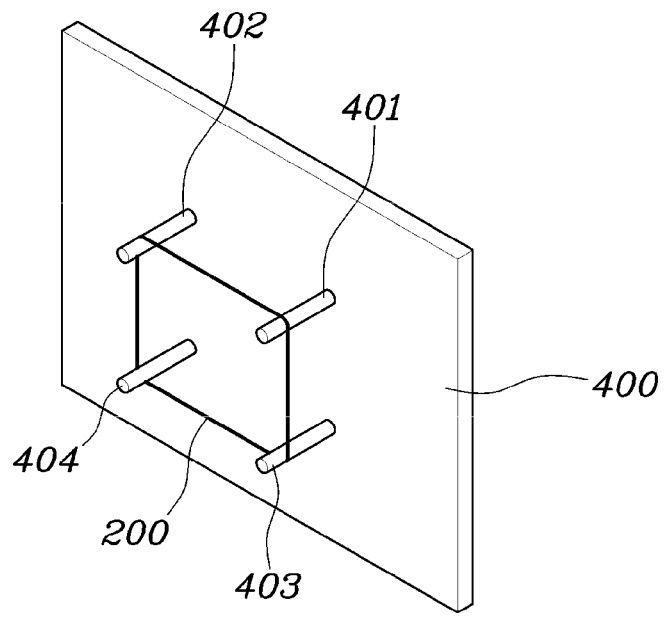
FIG. 1 is a conceptual view of a jig to manufacture a three-dimensional preform using a tow.

Hereinafter, the present invention will be described in detail with reference to the accompanying drawings. Like reference numerals refer to like elements for convenience of description.

A jig may be used to manufacture a three-dimensional composite preform. For example, to obtain a "☐" shaped preform, a jig may be necessary shown in FIG. 1.

Referring to FIG. 1, a jig 400 includes four guiding members 401 to 404 disposed at positions respectively corresponding to four vertices of a "☐" shape. The "☐" shaped preform may be manufactured by discharging and winding a tow 200 around the guiding members 401 to 404, from the first guiding member 401 to the forth guiding member 404 consecutively. A robot may be used to wind the tow 200 around the guiding members 401, 402, 403 and 404 to form the preform.

Figure 2:
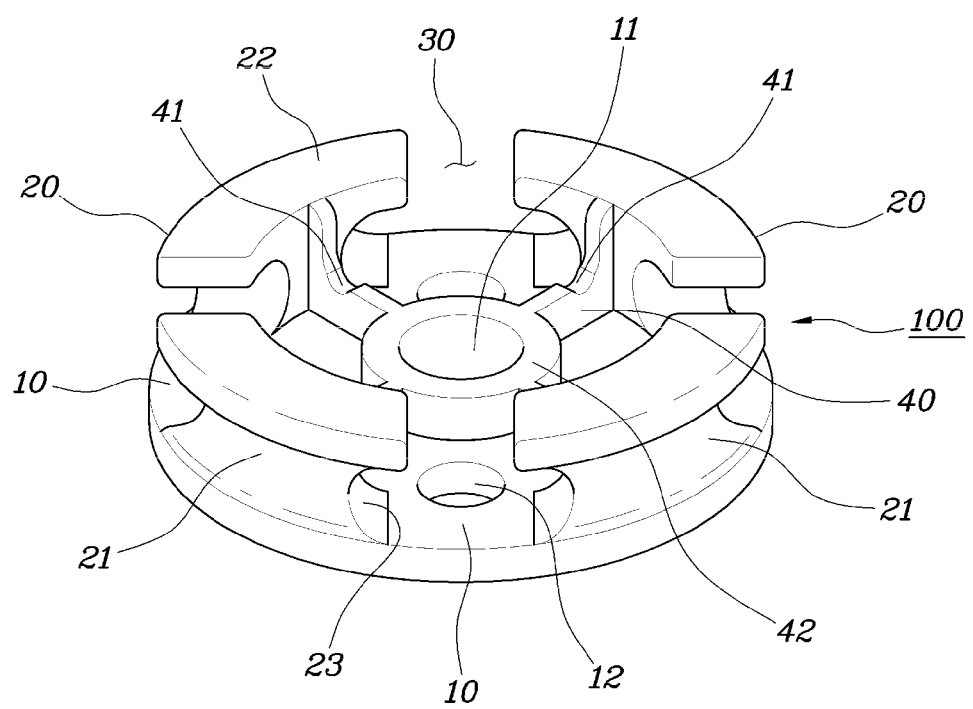
FIG. 2 is a perspective view of a bushing according to an embodiment of the present invention.
Figure 3:
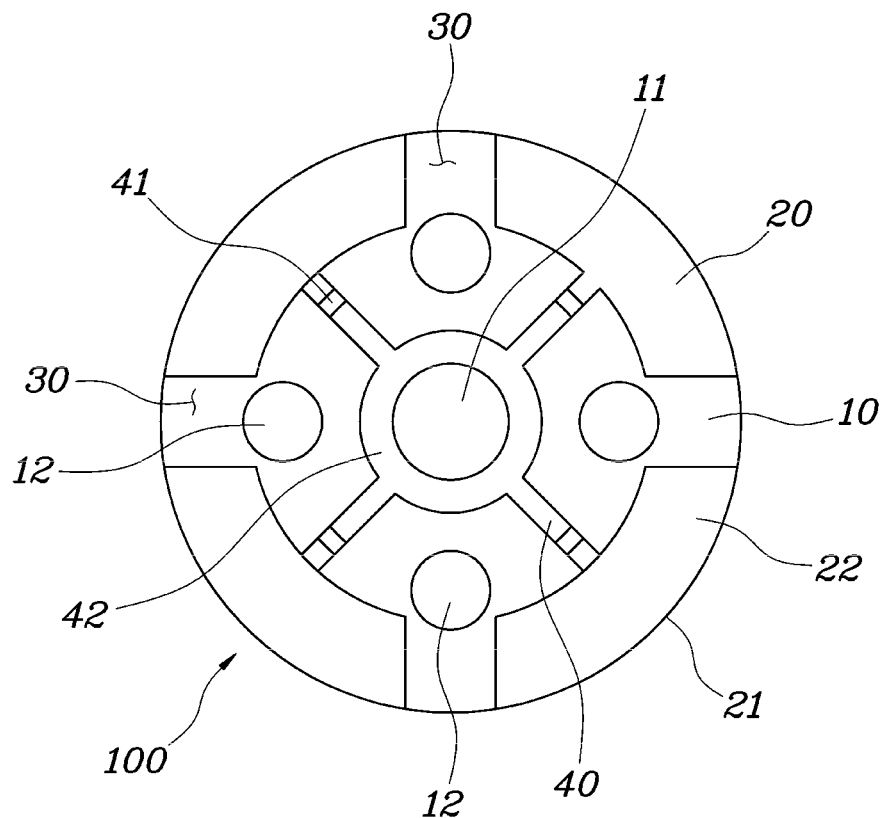
FIG. 3 is a plan view of the bushing illustrated in FIG. 2.

Referring to FIGS. 2 and 3, a bushing 100 according to an embodiment may have a structure in which four spools 20 are arranged in a leg shape on a base plate 10.

A through-hole may be formed in the base plate 10. According to an embodiment, the through-hole comprises a main hole 11 and one or more sub holes 12. The main hole 11 may be formed in a center portion of the base plate 10. The sub holes 12 may be formed around the base plate 10.

The bushing 100 may be mounted on the guide member 401, 402, 403 or 404 using the main hole 11. The bushing 100 may function as the guiding member when manufacturing the preform using the tow 200. One or more bushings 100 may be used to manufacture a preform.

As shown in FIG. 2, four spools 20 may be spaced apart from each other along an edge of the base plate 10 and extend upward from the base plate 10. Each of the spools 20 has a flat top 22 and a groove 21. The flat top 22 is formed at an end portion of the spool 20 and the groove 21 is formed on an outer surface of the spool 20 in a circumferential direction of the bushing 100. The term 'flat top' just means that the top of the spool 20 is not sharp.

A tow 200 may be wound along the groove 21 when manufacturing a composite preform. The groove 21 may have both end portions in a width direction thereof. The height of the end portions in a width direction of the groove 21 is high and the central portion is relatively low. The groove 21 may have concave edges 23 in a circumferential direction of the base plate 10.

The openings 30 between spools 20 adjacent to each other in the circumferential direction of the bushing 100 may have an arch shape. The opening 30 may be used as a passage for the tow 200 and increase the degree of freedom for selecting an entry or an exit direction of the tow 200 into or from the bushing 100. The sub holes 12 may be used to place the bushing 100 correctly at a predetermined position to get the tow 200 into or out the bushing 100 while forming a preform.

Figure 4:
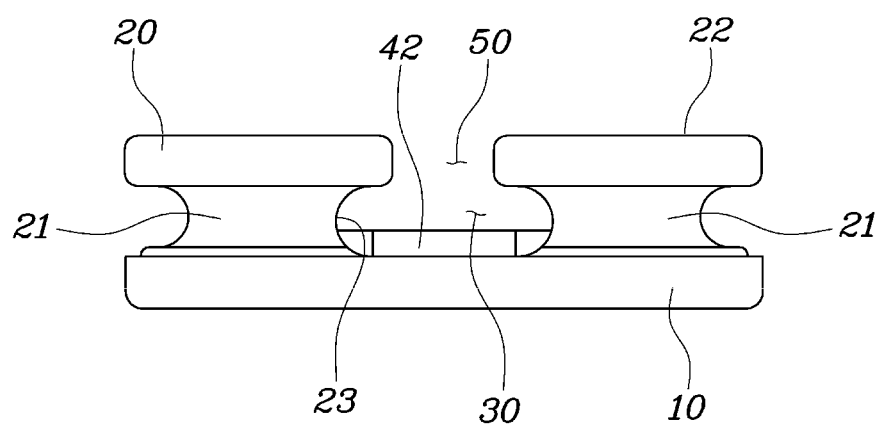
FIG. 4 is a side view of the bushing illustrated in FIG. 2.

Referring to FIGS. 3 and 4, the bushing 100 has an open structure such that the opposite side of the base plate 10, which is defined by the spools 20 and the base plate 10, is not completely covered by the flat top 22, but open. The flat top 22 may be designed to have an appropriate length and width so as to withstand a load perpendicularly applied to the flat top 22.

The bushing 100 may have a reinforcement structure to support the spools 20. Referring to FIGS. 2 and 3, ribs 40 may be formed on the base plate 10 to support the spools 20. The ribs 40 may extend across the base plate 10 to connect the spools 20 opposed to each other.

According to an embodiment, a column 42 having the main hole 11 may be erected on the base plate 10. The ribs 40 may be radially formed with respect to the column 42 to connect the spools 20. Guide grooves 41 for guiding the tow 200 may be formed on the ribs 40 in a circumferential direction of the bushing 100.

Figure 5:
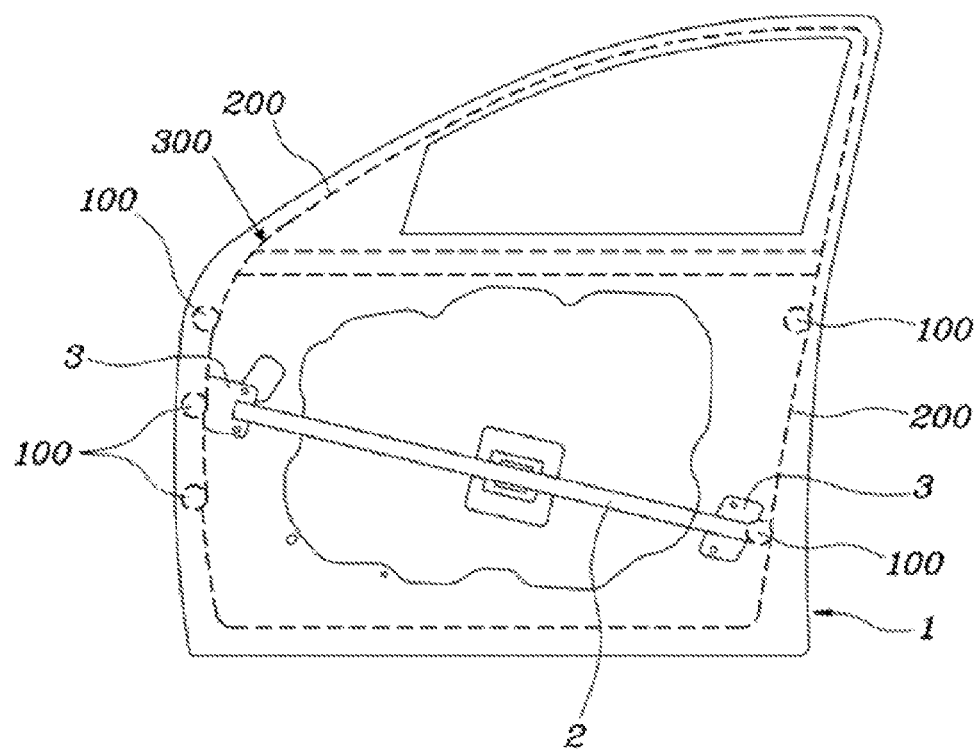
FIG. 5 is a schematic view of a door for a vehicle, which is manufactured by using a preform integrated with a bushing according to an embodiment of the present invention.

An example in which the bushing 100 according to the embodiment is applied to manufacture a door inner panel 1 will be described with reference to FIG. 5.

The door inner panel 1 may be manufactured by injection molding or compression molding. The preform 300 is inserted in a mold and then a polymer composite in liquid state is supplied to the mold to make the door inner panel 1.

The bushing 100 is integrated with the preform 300 while forming the preform 300 with the tow 200. The preform 300 may be manufactured by using a jig capable of forming a shape of the preform 300 and a robot capable of discharging the tow 200.

To manufacture a preform 300, it is necessary to design properly a shape of the preform 300 and an installation position of the bushing 100. The bushing 100 is needed in forming the preform 300 using the tow 200 while maintaining tension of the tow 200 and function as a reinforcing element withstanding a external force applied to the door inner panel 1.

The bushing 100 may be installed at a portion requiring strength of a body part. In the case of the door inner panel 1, for example, the bushing 100 may be installed on the periphery of brackets 3 at both ends of an impact beam 2. By a side impact collision, the brackets 3 may deviate from their positions before the impact beam 2 sufficiently absorbs the side impact. This can lead to serious problem.

The bushing 100 installed in the vicinity of the brackets 3 withstands the side collision force before or together with the brackets 3 and absorbs the side collision force using the tension of the tow 200 wound around the bushing 100. The preform 300 integrated with the bushing 100 may be disposed at an outer side of the door inner panel 1.

An example of using the bushings 100 and 110 according to embodiments may be described with reference to FIGS. 6A to 8.

Figure 6A:
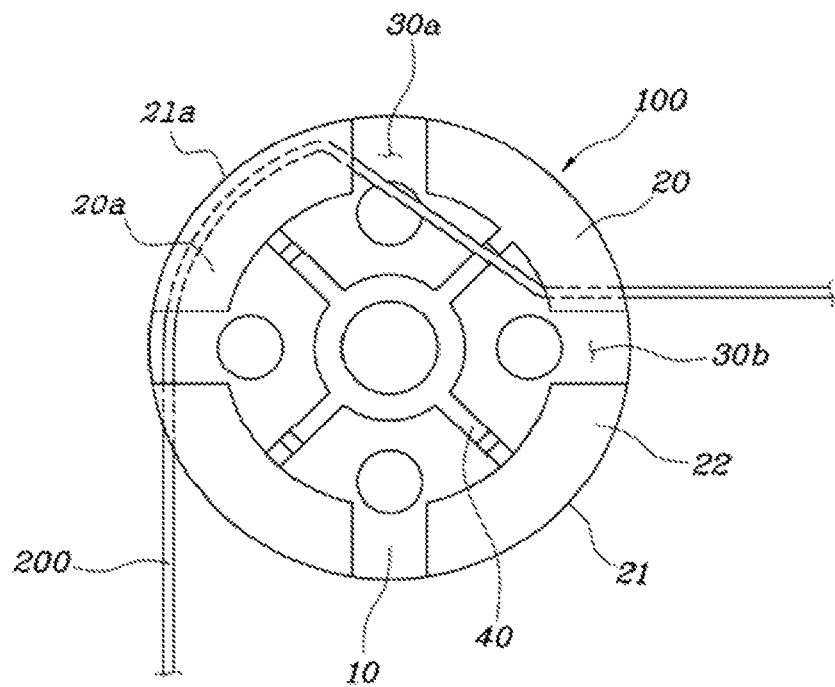
FIGS. 6A to 6C are usage examples of the bushing according to an embodiment of the present invention.

Referring to FIG. 6A, in a case where the path of the tow 200 has to be changed about 90° at the position of bushing 100 to manufacture a preform 300, it may be accomplished by winding the tow 200 along a first groove 21a of a first spool 20a, getting the tow 200 into a first opening 30a, and then getting out the tow 200 through a second opening 30b adjacent to the first opening 30a.

Figure 6B:
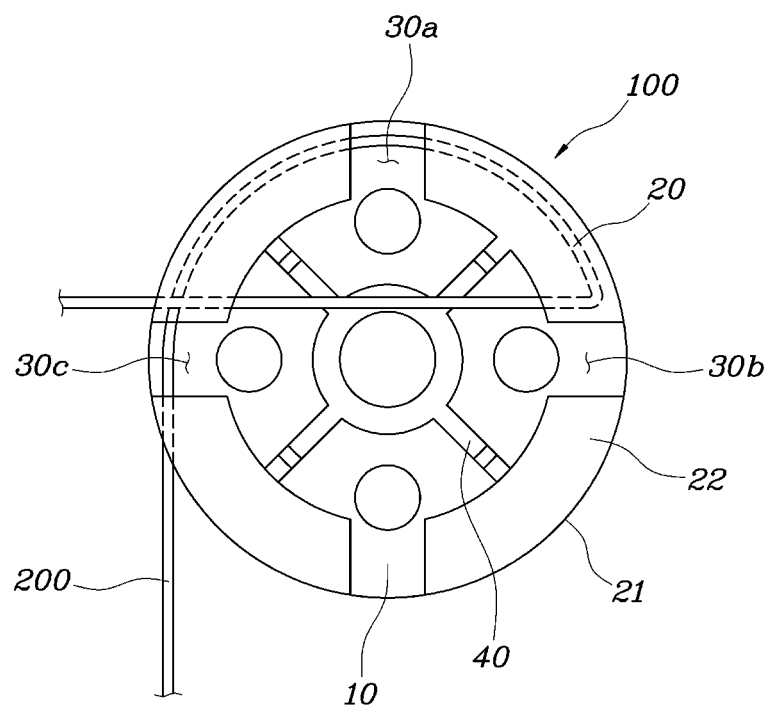

FIG. 6B is a diagram for describing a case where the tow 200 is turned about 90° in a direction opposite to that of in FIG. 6A by using the bushing 100. In either case, the path of the tow 200 may be very conveniently changed using the bushing 100 while maintaining tension of the tow 200.

Figure 6C:
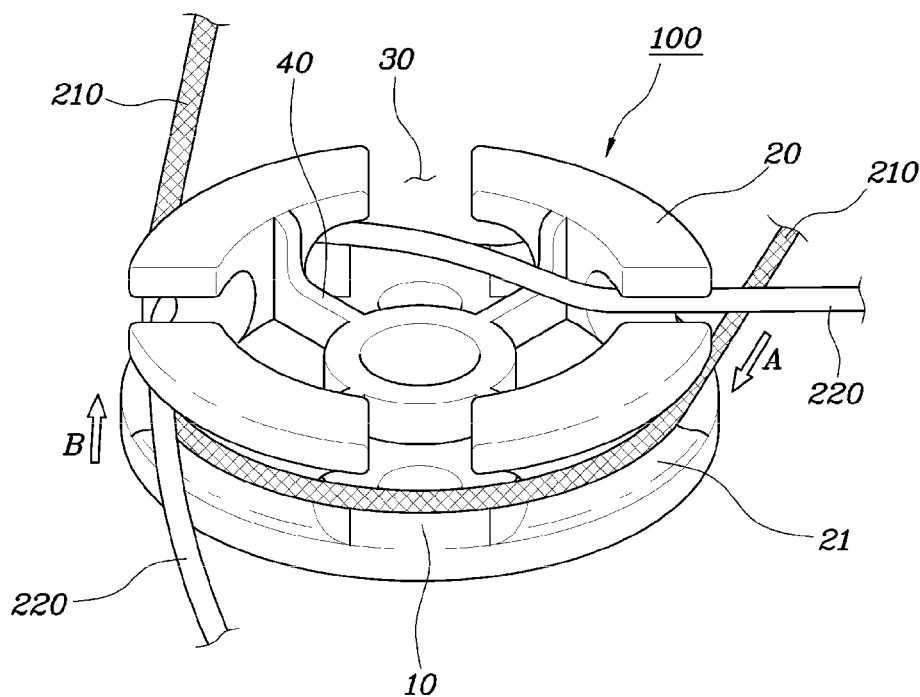

Referring to FIG. 6C, in a case where the bushing 100 according to the embodiment is used, a second tow 220 may be turned by inserting the second tow 220 into the bushing 100 in a second direction B while a first tow 210 is turned by inserting the first tow 210 into the bushing 100 in a first direction A. The bushing 100 allows to manufacture composite preforms of various shapes using the tow 200 and to reduce the amount of the bushing 100 used to manufacture the preforms.

Figure 6D:
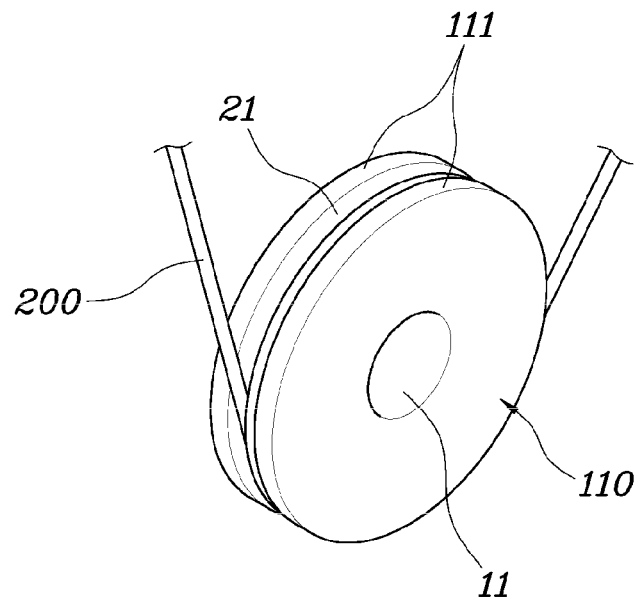
FIG. 6D shows an comparative example of a bushing.

A comparative example of a bushing is shown in FIG. 6D. Referring to FIG. 6D, the bushing 110 may have a reel shape in which flanges 111 are formed at both sides. In order to change the direction of a tow 200 about 90° using the bushing 110 while maintaining tension of the tow 200, it is necessary to wind the tow 200 about 1.5 times around the bushing 110 along its groove 21. The comparative example is inconvenient to use comparing to the bushing according to the embodiment of the present invention. The amount of the tow 200 used increases comparing the cases of FIGS. 6A and 6B. The bushing 110 may be used together with the aforementioned bushing 100 according to the embodiment.

Figure 7:
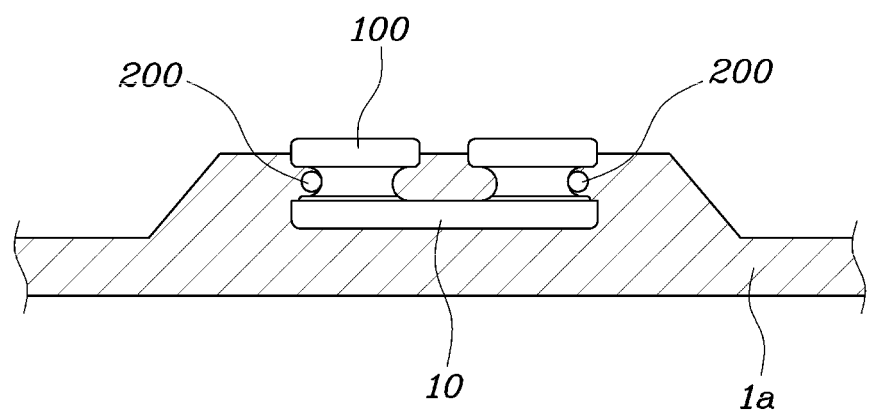
FIG. 7 is a schematic cross-sectional view of a structural composite component to which a bushing according to an embodiment of the present invention is applied.

Referring to FIGS. 3, 4 and 7, in a case where the bushing 100 according to the embodiment is used, an injected material is introduced through the through holes 11 and 12 and the opening 30 during an insert-molding of the preform 300 to fill in the space 50 defined by the base plate 10 and the spools 20. Since the contact area is large between the injected material and the bushing 100 and the base plate 10 having the through-holes 11 and 12 functions as an anchor, the bushing 100 is able to be fixed stably to a molded composite body part 1a.

Figure 8:
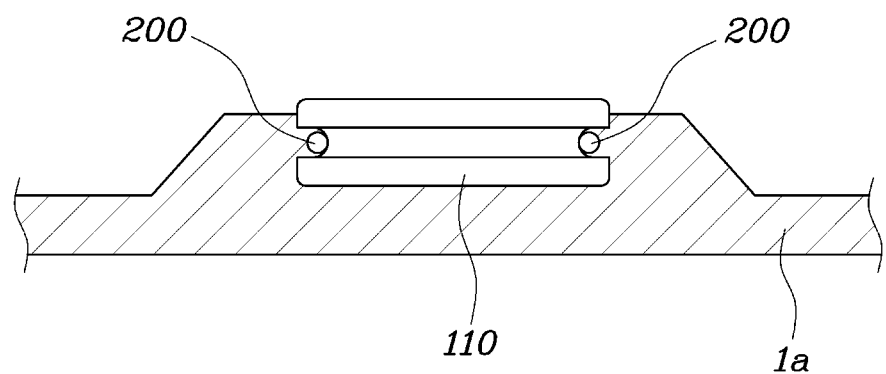
FIG. 8 is a schematic cross-sectional view of a structural composite component to which the bushing in FIG. 6D is applied.

FIG. 8 is a schematic cross-sectional view of a molded body part 1a having the bushing 110 shown in FIG. 6D. A fixation power of the bushing 110 to the molded body part 1a may be less than that of the bushing 100 to the molded body part 1a in FIG. 7.

As described above, the bushing for manufacturing the structural composite preform according to the present invention may have a high degree of freedom in selecting an entry or exit angle of the tow. A degree of freedom is high for forming the shape of the preform, or for selecting the installation position of the bushing.

In addition, according to the present invention, due to a high degree of freedom in forming the shape of the preform, it may be possible to reduce the number of the bushings to be used to form the preform, and it may be possible to reduce the use of the tow such as a CFRP and the production costs of the preform.

According to the present invention, a structural composite component may be manufactured by insert-molding. The bushing may be integrally manufactured with the preform and may be placed in a mold together with the preform when forming the structural composite component. The bushing may improve support stiffness with respect to an external load applied to a component.

According to the present invention, since an injected material is also introduced to an upper portion of the base plate through openings such as through-holes of the bushing at the time of insert-molding, a fixation power of the bushing to the injected material, i.e., the structural composite component may be excellent.

According to the present invention, due to a high degree of freedom in forming a shape, it may be possible to improve the tension of the tow. Therefore, it may be possible to improve the support stiffness and the absorption force with respect to a load applied to the structural composite component.

While specific embodiments of the present invention have been illustrated and described, it will be understood by those skilled in the art that changes may be made to those embodiments without departing from the spirit and scope of the invention that is defined by the following claims.

What is claimed is:

1. A structural body part for a vehicle, the structural body part comprising:
    a molded both part;
    a preform made by a tow; and
    a bushing used to form the preform and integrated with the preform, wherein the tow is wound around the bushing,
    wherein the preform and the bushing are pre-inserted in a mold when forming the molded body part and combined in the molded body part, and
    wherein the bushing comprises:
    a base plate; and
    two or more spools spaced apart from each other on the base plate along an edge thereof,
    wherein each of the spools extends upward from the base plate and has a top and a groove, the top being formed at an end portion of the spool, and the groove being formed on an outer surface of the spool in a circumferential direction of the bushing, wherein the tow is wound along the groove, and
    wherein a portion opposite to the base plate and surrounded by the spools is open, and the portion is filled with the molded body part.

2. The structural body part of claim 1, wherein a through-hole is formed on the base plate, the through-hole being filled with the molded body part.

3. The structural body part of claim 2, wherein the through-hole comprises a main hole formed at a center portion of the base plate, and
    wherein a hollow column having the main hole is formed on the base plate, and ribs are radially formed with respect to the column to connect the spools.

4. The structural body part of claim 3, wherein the through-hole further comprises one or more sub holes formed around the base plate.

5. The structural body part of claim 1, wherein the top of each spool is flat.

6. The structural body part of claim 1, wherein the bushing further comprises a reinforcement structure formed on the base plate to support the spools.

7. The structural body part of claim 6, wherein a guide groove is formed on the reinforcement structure along a circumferential direction of the base plate.

8. The structural body part of claim 1, wherein both end portions of the spools in a circumferential direction of the bushing are concave.

* * * * *